United States Patent Office 3,222,359
Patented Dec. 7, 1965

3,222,359
PROCESS FOR PREPARING BENZODIAZEPINE COMPOUNDS
Earl Reeder, Nutley, and Leo Henryk Sternbach, Upper Montclair, N.J., assignors to Hoffmann-La Roche Inc., Nutley, N.J., a corporation of New Jersey
No Drawing. Filed June 21, 1962, Ser. No. 204,034
4 Claims. (Cl. 260—239)

This application is a continuation-in-part of application Serial No. 156,988, filed December 4, 1961, now abandoned, and of application Serial No. 127,493 filed July 28, 1961, now abandoned.

This invention relates to a novel class of heterocyclic compounds which have valuable medicinal properties. Also included within the scope of the invention are methods for the preparation of these compounds as well as certain novel intermediates therefor.

The novel medicinally valuable heterocyclic compounds of this invention can be characterized as 5-phenyl-1,2-dihydro-3H1,4-benzodiazepines and 5-phenyl-1,2,4,5-tetrahydro-3H-1,4-benzodiazepines.

More particularly the novel heterocyclic compounds of the invention are selected from the group consisting of compounds of the formula

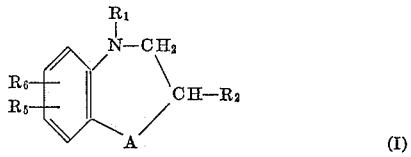

(I)

and acid-addition salts of the basic compounds conforming to said formula, wherein A is selected from the group consisting of

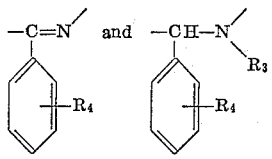

$R_1$ and $R_3$ are selected from the group consisting of hydrogen, lower alkyl, lower alkenyl, and lower alkanoyl; $R_2$ is selected from the group consisting of hydrogen and lower alkyl; and $R_4$, $R_5$, and $R_6$ are selected from the group consisting of hydrogen, halogen, trifluoromethyl, nitro, amino, lower alkanoylamino, lower alkylthio, lower alkylsulfonyl, lower alkylsulfinyl, lower alkoxy, hydroxy, lower alkyl, cyano, carboxy, carbo-lower alkoxy, carbamyl, and di-lower alkylamino.

As used in this disclosure, the term "lower alkyl" comprehends both straight and branched chain carbon-hydrogen radicals, such as methyl, ethyl, propyl, isopropyl, butyl, and the like. The term "lower alkenyl" includes straight and branched chained carbon-hydrogen radicals, wherein at least one carbon to carbon bond is unsaturated, such as allyl and the like. The term "lower alkanoyl" includes the acyl residue of lower alkanoic acids, for example, acetyl, propionyl, and the like. Preferred compounds of the invention are those of Formula I above, wherein $R_4$, $R_5$, and $R_6$ are selected from the groups consisting of hydrogen, halogen, trifluoromethyl, nitro, lower alkylthio, lower alkylsulfinyl, cyano, amino, and di-lower alkylamino. Especially preferred are those bearing a substituent in the 7 and/or 2′ position. Especially preferred substituents are halogen, trifluoromethyl and amino.

The basic members of the group of compounds defined by Formula I above form acid-addition salts. The basic members are those wherein no more than one of $R_1$ and $R_3$ is lower alkanoyl. These compounds form medicinally acceptable acid-addition salts with pharmaceutically acceptable acids, including both inorganic and organic acids, such as nitric acid, sulfuric acid, hydrochloric acid, hydrobromic acid, phosphoric acid, acetic acid, citric acid, succinic acid, benzoic acid, formic acid, p-toluene sulfonic acid, and the like.

Compounds falling under the scope of Formula I above which can be characterized as 5-phenyl-1,2-dihydro-3H-1,4-benzodiazepines are of the formula

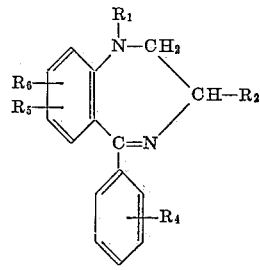

(II)

wherein $R_1$, $R_2$, $R_4$, $R_5$ and $R_6$ have the same meaning as above.

Compounds falling under the scope of Formula I above which can be characterized as 5-phenyl-1,2,4,5-tetrahydro-3H-1,4-benzodiazepines are of the formula

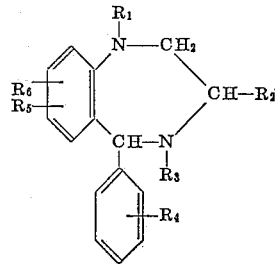

(III)

wherein $R_1$, $R_2$, $R_3$, $R_4$, $R_5$, and $R_6$ have the same meaning as above.

Compounds of Formula I above, which is inclusive of the compounds of Formulas II and III above, and medicinally acceptable acid-addition salts of such compounds, are valuable therapeutic agents being useful as muscle relaxants, sedatives, and anticonvulsants. These compounds can be administered internally, for example, parenterally or orally, and can be compounded into conventional pharmaceutical dosage forms with amounts adjusted to individual requirements, such as tablets, capsules, lozenges, suppositories, suspensions, solutions, and the like.

Compounds of Formula II above can be produced via the reaction of an alkylene-1,2-diamine of the formula

(IV)

wherein $R_2$ has the same meaning as above, with a benzophenone containing a halogen substituent ortho to the carbonyl group. The o-halobenzophenones used are thus of the formula

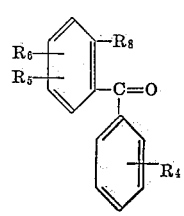

(V)

wherein $R_4$, $R_5$ and $R_6$ have the same meaning as in Formula I above, and $R_8$ is halogen.

The process can either proceed directly, or through intermediates of the formula

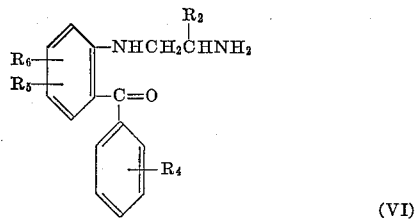

wherein $R_2$, $R_4$, $R_5$ and $R_6$ have the same meaning as in Formula I above, which can then be cyclized to compounds of Formula II above. The alkylene-1,2-diamine, for example ethylenediamine, can be used in excess and serve as the reaction media. In the alternative a conventional inert organic solvent, e.g. alcohol or a tertiary base such as pyridine, picoline, quinoline or the like, can be used as the reaction media. In a preferred embodiment the reaction is effectuated at an elevated temperature, for example above about 75° C. The maximum temperature would, of course, be the boiling point of the reaction media. The halogen, besides by the carbonyl substituent adjacent thereto, can be additionally activated via the presence of another substituent ortho or para thereto. Preferred activating substituents are trifluoromethyl, nitro, lower alkylsulfinyl, cyano, carboxy, carbo-lower alkoxy, carbamyl and the like. A preferred embodiment of this process comprises reacting ethylenediamine with a 2-halobenzophenone bearing in the 5-position an activating substituent selected from the group consisting of trifluoromethyl, nitro, lower alkyl sulfinyl, cyano, carboxy, carbo-lower alkoxy, and carbamyl. As stated above this condensation yields compounds of Formula II above.

The compounds of Formula VI above are novel intermediates and are comprehended by the scope of the present invention. As indicated in the examples, the preparation of other starting materials, which are not a part of the invention, is disclosed herein in order that the present disclosure may be complete.

Compounds corresponding to Formulas I through III above, which are obtained by the various processes of this invention, can be converted to other compounds corresponding to Formulas I through III above. For example, compounds corresponding to Formulas I through III above wherein either $R_1$ or $R_3$ is hydrogen can be converted to corresponding compounds wherein the hydrogen is replaced with lower alkyl, lower alkenyl, or lower alkanoyl by alkylation, alkenylation, or alkanoylation. Compounds corresponding to Formula III can be obtained by reduction of compounds corresponding to Formula II. Compounds wherein one of $R_5$ and $R_6$ is hydrogen can be nitrated. Compounds wherein $R_4$, $R_5$ or $R_6$ is amino can be acylated to yield corresponding compounds bearing a lower alkanoylamino substituent, or can be reacted to effect exchange of the amino group for a cyano or halogen substituent. Furthermore, compounds wherein $R_4$, $R_5$ or $R_6$ is amino can be prepared by reduction of corresponding compounds bearing a nitro substituent.

The following examples are illustrative but not limitative of the invention. Other embodiments will be obvious to those skilled in the art and are comprehended by the scope of the invention. All temperatures are stated in degrees centigrade, and all melting points are corrected.

Example 1

80 g. of sodium nitrite were added slowly with stirring to 460 ml. of concentrated slulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

The above mentioned 2-chloro-trifluoromethylbenzophenone is not a part of this invention but intermediates therefor and the processes for making same have been herein set forth in order that the present disclosure may be complete.

2-chloro-5-trifluoromethylbenzophenone (82.1 g.) was dissolved in anhydrous pyridine (300 ml.) and the solution treated with ethylenediamine (100 ml., 89.9 g.). The mixture was stirred and refluxed during 5 hours under dry conditions, then allowed to cool overnight. The solution was evaporated in vacuo and the residue dissolved in 0.6 N hydrochloric acid (500 ml.) and extracted with ether. The aqueous layer was cooled in an ice bath and made basic with 3 N sodium hydroxide solution. The resulting suspension was extracted with ether, the extract was washed with water, dried over anhydrous magnesium sulfate, and evaporated to give the product as a pale yellow gum which rapidly crystallized. This material was recrystallized from hexane, giving yellow needles of 7-trifluoromethyl-5-phenyl-1,2-dihydro-3H-1,4-benzodiazepine. Two further recrystallizations from hexane yielded pale yellow needles melting at 110–111°.

7-trifluoromethyl-5-phenyl-1,2-dihydro - 3H - 1,4-benzodiazepine (29.4 g.) was dissolved in methanol (56 ml.) and the solution was treated with 2 N hydrochloric acid in methanol (56 ml.), cooling the stirred mixture in an ice bath during addition of the acid solution. The mixture was then evaporated at 25° and the residue was died by azeotropic distillation with anhydrous benzene. The residue was then triturated with benzene and the crystalline product filtered off, washed with ether and dried at 60° in vacuo to give the crude 7-trifluoromethyl-5-phenyl-1,2-dihydro-3H-1,4-benzodiazepine hydrochloride as yellow crystals. Recrystallization from methanol/ether yielded bright yellow prisms melting at 283–285°.

Example 2

A solution of 208 g. of 2-chloro-5-nitrobenzophenone in a mixture of 500 ml. of pyridine and 200 ml. of ethylenediamine was refluxed for 5 hours. Some solvent was distilled off at atmospheric pressure, then the reaction mixture was concentrated in vacuo to dryness. Methanol was added to the residue and the crude reaction product filtered off. Additional reaction product was obtained from the filtrate as follows: It was concentrated to dryness and the residue was dissolved in a mixture of methylene chloride and water. The organic layer was separated, dried and concentrated to a small volume yielding the above mentioned second crop.

The reaction product was recrystallized from acetone and formed yellow needles of 7-nitro-5-phenyl-1,2-dihydro-3H-1,4-benzodiazepine melting at 211–212°.

To a solution of 160 g. of 7-nitro-5-phenyl-1,2-dihydro-3H-1,4-benzodiazepine in 1.6 liters of dimethylformamide was added 35.6 g. of sodium methoxide and the resulting mixture was stirred at room temperature for one hour. Then 62.5 ml. of dimethyl sulfate was added and the stirring continued for 2 more hours. Water was then added to the reaction mixture and crude product filtered off.

Upon recrystallization from a mixture of methylene chloride and ether, 1-methyl-7-nitro-5-phenyl-1,2-dihydro-3H-1,4-benzodiazepine was obtained as yellow prisms melting at 187–188°.

Example 3

A mixture of ortho-fluorobenzophenone (10 g.) and ethylenediamine (50 ml.) was refluxed for two hours. Ice (400 g.) was added to the hot solution and the precipitated oil extracted into methylene chloride (3 x 50 ml.). The organic layers were combined, washed with water (3 x 50 ml.) and the base extracted into 1 N hydrochloric acid (3 x 75 ml.). The orange solution of the hydrochloride was washed with methylene chloride (2 x 50 ml.) and the base then precipitated by neutralizing with 30% sodium carbonate solution. The base was then extracted into methylene chloride (3 x 50 ml.), the organic layers combined, dried over anhydrous sodium sulfate and filtered. Removal of the solvent and recrystallization of the residue from hexane gave 5-phenyl-1,2-dihydro-3H-1,4-benzodiazepine, as pale yellow needles melting at 144–146°.

Example 4

A solution of 4 g. of 2-chlorobenzophenone in 40 ml. of ethylenediamine was refluxed for 17 hours. The cooled mixture was poured into 300 ml. of ice water and extracted with ether. The ether was evaporated and the residue was refluxed for 3 hours in a mixture of 20 ml. of ethanol and 40 ml. of 20% hydrochloric acid. The main amount of ethanol was removed in vacuo and the aqueous phase was extracted with ether. The aqueous phase was made alkaline with sodium hydroxide and extracted with ether. After washing with water and drying with sodium sulfate, the ether was evaporated and the residue consisting mainly of 2-($\beta$-aminoethylamino)-benzophenone was cyclized by refluxing for 16 hours in 50 ml. of pyridine containing 0.5 g. of pyridinium hydrochloride. The pyridine was removed in vacuo and the residue partitioned between ether and 2 N sodium hydroxide. The ether layer was washed with water, dried with sodium sulfate and concentrated. Faintly yellow leaflets of 1,2-dihydro-5-phenyl-3H-1,4-benzodiazepine were obtained which after recrystallization from ether melted at 140–142°.

Example 5

A solution of 4 g. of 2,5-dichlorobenzophenone in 50 ml. of ethylenediamine was refluxed for 17 hours. The cooled mixture was poured into 500 ml. of ice water and extracted with ether. The ether was evaporated and the residue refluxed for 5 hours in a mixture of 25 ml. of ethanol and 50 ml. of 20% hydrochloric acid. The main amount of alcohol was removed in vacuo and the aqueous phase was extracted with ether. The aqueous phase was made alkaline with sodium hydroxide and extracted with ether. After washing with water and drying with sodium sulfate the ether was evaporated and the residue consisting mainly of 2-($\beta$-aminoethylamino)-5-chlorobenzophenone was cyclized by refluxing for 17 hours in 30 ml. of pyridine containing 0.5 g. of pyridinium hydrochloride. The pyridine was removed in vacuo and the residue partitioned between ether and 2 N sodium hydroxide. The ether layer was washed with water, dried with sodium sulfate and concentrated. Yellow prisms of 7-chloro-1,2-dihydro-5-phenyl-3H-1,4-benzodiazepine were obtained which after recrystallization from ether melted at 170–171°.

Example 6

A solution of 50 g. of 2-chloro-5-nitrobenzophenone in a mixture of 100 ml. of 1,2-propylenediamine and 450 ml. of pyridine was stirred and refluxed for 6 hours. The reaction mixture was concentrated in vacuo to a smaller volume and the crystalline reaction product was filtered off and upon recrystallization from methylene chloride formed yellow plates of 3-methyl-7-nitro-5-phenyl-1,2-dihydro-3H-1,4-benzodiazepine melting at 249–250°.

A solution of 2 g. of 3-methyl-7-nitro-5-phenyl-1,2-dihydro-3H-1,4-benzodiazepine in 40 ml. of 3 N hydrochloric acid was refluxed for 21 hours, cooled, made alkaline with dilute sodium hydroxide and extracted with methylene chloride. The organic layer was separated, dried and concentrated in vacuo. The residue was crystallized from a mixture of methylene chloride and ether. The first crop of crystals was starting material. From the filtrate crystalline reaction product was obtained which, after recrystallization from the same solvent mixture, formed yellow needles of 2-(2-aminopropylamino)-5-nitrobenzophenone melting at 98–99°. Refluxing of a pyridine solution of this compound caused re-cyclization to 3-methyl-7-nitro-5-phenyl-1,2-dihydro-3H-1,4-benzodiazepine.

A solution of 2-(2-aminopropylamino)-5-nitrobenzophenone in 10 ml. methanol was acidified with an excess of methanolic hydrogen chloride. Ether was added, and the crystalline hydrochloride was separated by filtration. After recrystallization from methanol/ether it formed yellow prisms melting at 204–205°.

A suspension of 28.1 g. of 3-methyl-7-nitro-5-phenyl-1,2-dihydro-3H-1,4-benzodiazepine in 250 cc. of methanol was hydrogenated at room temperature and atmospheric pressure in the presence of 6 g. of wet Raney nickel catalyst. After the absorption of 0.3 mole of hydrogen, the reaction came to a complete stop. The catalyst was filtered off, the filtrate acidified with an excess of methanolic hydrogen chloride and concentrated in vacuo to dryness. Ethanol was added to the residue and the crude reaction product was separated by filtration. Recrystallization from a mixture of ethanol and ether yielded 7-amino-3-methyl-5-phenyl-1,2-dihydro-3H-1,4-benzodiazepine dihydrochloride as yellow prisms which darkened at 265° and melted with decomposition at 277–280°. The base was liberated from the hydrochloride by treatment with alkali. It crystallized from ether in brown prisms melting at 128–129°.

Example 7

A solution of 2 g. of 7-nitro-5-phenyl-1,2-dihydro-3H-1,4-benzodiazepine in a mixture of 20 ml. of ethanol and 20 ml. of 3 N hydrochloric acid was refluxed for 18 hours. The reaction mixture was then concentrated in vacuo and the residue was crystallized from methanol to yield crude 2-(2-aminoethylamino)-5-nitrobenzophenone hydrochloride. After recrystallization from a mixture of methanol and ether, it formed yellow needles melting at 225–227° (dec.).

The base was liberated from the hydrochloride with alkali and after crystallization from ether formed yellow prisms melting at 118–119°. It could be re-cyclized to 7-nitro-5-phenyl-1,2-dihydro-3H-1,4-benzodiazepine by refluxing a 5% solution in pyridine for 2.5 hours.

*Example 8*

To a stirred suspension of 0.76 g. of lithium aluminum hydride in 25 ml. of dry tetrahydrofuran was added a solution of 2.84 g. of 7-chloro-3-methyl-5-phenyl-3H-1,4-benzodiazepin-2(1H)-one in 50 ml. of tetrahydrofuran. The reaction mixture was refluxed for 25 minutes then cooled with ice and treated with ether saturated with water. The insoluble precipitate was separated by filtration, and the filtrate dried and concentrated in vacuo. The residue was dissolved in 0.1 N hydrochloric acid and the solution filtered by gravity. The filtrate was made alkaline with dilute sodium hydroxide and extracted with methylene chloride. The organic layer was separated, dried and concentrated in vacuo to dryness. The residue was crystallized from a mixture of ether and petroleum ether, and the crude reaction product was separated by filtration. Recrystallization from the same solvent mixture yielded 7-chloro-3-methyl-5-phenyl-1,2-dihydro-3H-1,4-benzodiazepine as pale yellow prisms melting at 127–128°.

The same compound was prepared as follows: To a cooled stirred solution of 6.4 g. of 7-amino-3-methyl-5-phenyl-1,2-dihydro-3H-1,4 - benzodiazepine dihydrochloride in 30 ml. of 6 N hydrochloric acid was added within ten minutes 20 ml. of 1 N sodium nitrite solution while the temperature was kept below +5°. The solution was stirred an additional 15 minutes at 0° and then added within 5 minutes to a stirred solution (temperature: 28°) of 4 g. of cuprous chloride in 40 ml. of concentrated hydrochloric acid. The mixture was stirred at room temperature for 15 minutes, heated to 40° for 30 minutes, then heated to 85–90° for 20 minutes. The reaction mixture was then cooled, treated with an excess of ammonium hydroxide and extracted with methylene chloride. The organic layer was dried, concentrated in vacuo and the residue was dissolved in ether and filtered by gravity through 60 g. of "Woelm" alumina I. The first 250 cc. of ether gave upon concentration an oily residue which was crystallized from a mixture of ether/petroleum ether and yielded crystalline reaction product which upon one recrystallization from the same solvent mixture melted at 126–127°. The reaction product gave no melting point depression with a sample of the product prepared according to the method set forth in the paragraph immediately above and showed also an identical infrared spectrum.

*Example 9*

2-chloro-5-trifluoromethylbenzophenone (200 g.) was dissolved in anhydrous pyridine (250 ml.) and treated with ethylenediamine (210 g.). The solution was stirred and refluxed during five hours, with protection from atmospheric moisture. The dark colored mixture was then evaporated in vacuo, and the oily residue was dissolved in methylene chloride (1 l.). This solution was washed with water (0.5 l.), containing sufficient sodium carbonate to make the aqueous layer strongly basic. The methylene chloride extract was further washed with water until the washings were neutral, then dried over anhydrous sodium sulfate and evaporated in vacuo, to give the crude product as a light brown oil which was dissolved in methanol (200 ml.), and the resulting solution was slowly poured into stirred ice-cold 1 N hydrochloric acid (4 l.), resulting in precipitation of a yellow hydrochloride. The mixture was stirred overnight at room temperature, and then the yellow precipitate was filtered off and washed with ether. The aqueous and ether filtrates were shaken together and separated and the ether layer was washed with water until neutral. The aqueous acid layer together with the yellow-colored washings were combined with the precipitated hydrochloride, and the mixture carefully made basic by dropwise addition of 5 N sodium hydroxide solution, with cooling and stirring of the mixture. The resulting precipitate was extracted with methylene chloride, and the extract was washed with water, dried over sodium sulfate and evaporated to give a yellow-brown gum, which consisted mostly of the desired base, 2,3-dihydro-5-phenyl-7-trifluoromethyl - 1H-1,4-benzodiazepine, and another compound, 2-(2-aminoethylamino)-5-trifluoromethylbenzophenone. This mixture was dissolved in pyridine (600 ml.), and the solution was refluxed during three hours to effect cyclization of the aminoketone. Evaporation of the pyridine solution yielded a brown gum, which was purified by dissolving it in methylene chloride, washing the solution with water (3 x 250 ml.), drying over sodium sulfate, followed by filtration of the solution through a short wide chromatography column containing "Woelm" neutral alumina, activity III (125 g.). Evaporation of the eluates, and recrystallization of the residue from a mixture of benzene (150 ml.) and hexane (1 l.) yielded 2,3-dihydro-5-phenyl-7-trifluoromethyl - 1H - 1,4 - benzodiazepine as yellow prisms, which upon recrystallization from hexane formed pale yellow prisms, M.P. 116–118°. This material appeared to be a dimorphic crystalline form of that described in Example 1 above; the two compounds had identical infrared spectra in chloroform solution, identical $R_f$ values in thin-layer chromatography, and were interconvertible by recrystallization from hexane. Both compounds formed the same monohydrochloride described in Example 1 above.

We claim:

1. A method for the preparation of compounds of the formula

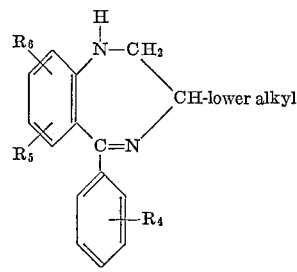

wherein $R_4$, $R_5$ and $R_6$ are selected from the group consisting of hydrogen, halogen, trifluoromethyl, nitro, amino, lower alkenoylamino, lower alkylthio, lower alkylsulfinyl, lower alkylsulfonyl, lower alkoxy, hydroxy, lower alkyl, cyano, carboxy, carbo-lower alkoxy, carbamyl and di-lower alkylamino which comprises reacting a compound of the formula

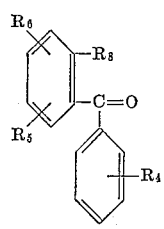

wherein $R_4$, $R_5$ and $R_6$ are as above and $R_8$ is halogen with a compound of the formula

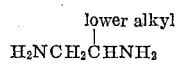

2. A method for the preparation of 7-trifluoromethyl-5-phenyl-1,2-dihydro-3H-1,4-benzodiazepine which comprises reacting 5 - trifluoromethyl - 2 - halobenzophenone with ethylenediamine.

3. A method for the preparation of 7-nitro-5-phenyl-1,2 - dihydro - 3H - 1,4 - benzodiazepine which comprises reacting 5-nitro - 2 - halobenzophenone with ethylenediamine.

4. A process for the preparation of compounds of the formula

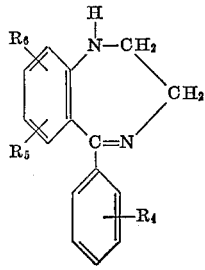

wherein $R_4$, $R_5$ and $R_6$ are selected from the group consisting of hydrogen, halogen, trifluoromethyl, nitro, amino, lower alkanoylamino, lower alkylthio, lower alkylsulfonyl, lower alkylsulfinyl, lower alkoxy, hydroxy, lower alkyl, cyano, carboxy, carbo-lower alkoxy, carbamyl and di-lower alkylamino which comprises reacting a compound of the formula

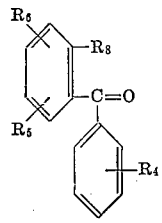

wherein $R_4$, $R_5$ and $R_6$ are as above and $R_8$ is halogen with ethylene diamine.

References Cited by the Examiner

UNITED STATES PATENTS 1,946,058   2/1934   Britton et al. _____ 260—570
2,431,285   11/1947  Suter et al. _____ 260—570

OTHER REFERENCES

Degering: Organic Nitrogen Compounds, 1945, pp. 232 and 309.

Elderfield, Heterocyclic Compounds, vol. 6, pp. 342–3 and 460–61.

Elderfield, Heterocyclic Compounds, vol. 4, pp. 46–47 (1952).

Elderfield, Heterocyclic Compounds, vol. 5, pp. 167 and 274–75 (1957).

Fieser et al.: Organic Chemistry, Third Edition, 1958, page 600.

Hill et al.: J. Chem. Soc. (London), pages 4430–4433 (1961).

NICHOLAS S. RIZZO, *Primary Examiner.*